(12) United States Patent
Vermelle et al.

(10) Patent No.: US 10,132,822 B2
(45) Date of Patent: Nov. 20, 2018

(54) METHOD FOR FORMING A CAPTIVE SPACER HOUSED IN A MOUNTING BASE OF AN ACCELEROMETER SENSOR AND SENSOR EQUIPPED WITH SUCH A MOUNTING BASE

(71) Applicants: CONTINENTAL AUTOMOTIVE FRANCE, Toulouse (FR); CONTINENTAL AUTOMOTIVE GmbH, Hannover (DE)

(72) Inventors: Xavier Vermelle, Calmont (FR); Van-Est Jeroen, Montgiscard (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 75 days.

(21) Appl. No.: 15/449,197

(22) Filed: Mar. 3, 2017

(65) Prior Publication Data
US 2017/0242049 A1     Aug. 24, 2017

(30) Foreign Application Priority Data
Feb. 12, 2016   (FR) ..................................... 16 51130

(51) Int. Cl.
*G01M 15/12* (2006.01)
*G01P 1/02* (2006.01)
(Continued)

(52) U.S. Cl.
CPC ............ *G01P 1/023* (2013.01); *F02F 7/0021* (2013.01); *G01L 23/222* (2013.01); *G01M 15/11* (2013.01); *G01P 15/097* (2013.01)

(58) Field of Classification Search
USPC .......................................... 73/114.07, 114.36
See application file for complete search history.

(56) References Cited

U.S. PATENT DOCUMENTS

| | | | | |
|---|---|---|---|---|
| 6,708,420 B1* | 3/2004 | Flanagan | ............... | G01B 7/012 33/556 |
| 2002/0056323 A1* | 5/2002 | Hosogoe | ............... | G01D 5/165 73/488 |

(Continued)

FOREIGN PATENT DOCUMENTS

| FR | 2 653 222 A1 | 4/1991 |
|---|---|---|
| FR | 2 821 432 A1 | 8/2002 |

OTHER PUBLICATIONS

FR Search Report, dated Oct. 4, 2016, from corresponding FR application, FR 1651130.

*Primary Examiner* — Eric S McCall
(74) *Attorney, Agent, or Firm* — Young & Thompson

(57) ABSTRACT

Disclosed is a method for forming a spacer extending at least partially within the length of a central bore passing from one side to the other of a barrel of a mounting base of an accelerometer sensor, the central bore being designed to receive a fastening element for fixing the mounting base onto a support element, the fastening element being centered by the spacer in the central bore, the mounting base being at least partially surrounded by an encapsulation of overmolded plastic material. When the plastic material is overmolded around the mounting base to form the encapsulation, a part of the plastic material passes through the barrel to form the spacer while fixing it to the encapsulation. Also described is a mounting base with at least one channel for the passage of the plastic material, and to an accelerometer sensor equipped with such a mounting base.

20 Claims, 4 Drawing Sheets

(51) Int. Cl.
*G01L 23/22* (2006.01)
*G01P 15/097* (2006.01)
*F02F 7/00* (2006.01)
*G01M 15/11* (2006.01)

(56) References Cited

U.S. PATENT DOCUMENTS

| | | | | |
|---|---|---|---|---|
| 2003/0015028 A1* | 1/2003 | Mukaiyama | ........... | G01D 5/165 73/114.37 |
| 2003/0167858 A1* | 9/2003 | Terui | ................. | G01D 5/34738 73/862.333 |
| 2004/0212261 A1* | 10/2004 | Uchiyama | .............. | H02K 29/10 310/68 B |
| 2006/0261804 A1* | 11/2006 | Itoh | ........................ | G01D 5/145 324/207.25 |
| 2006/0273784 A1* | 12/2006 | Godoy | ................... | G01D 5/145 324/207.2 |
| 2006/0274485 A1* | 12/2006 | Godoy | .................... | G01D 5/12 361/622 |
| 2007/0000455 A1* | 1/2007 | Akiyama | .............. | F02D 11/106 123/19 |
| 2009/0219014 A1* | 9/2009 | Hori | .................. | B62D 15/0215 324/207.16 |
| 2010/0001721 A1* | 1/2010 | Inotsuka | ................ | G01D 5/145 324/207.25 |
| 2010/0127697 A1* | 5/2010 | Storrie | .................... | G01D 5/145 324/207.24 |
| 2010/0147060 A1* | 6/2010 | Henning | ............ | B62D 15/0215 73/117.02 |
| 2010/0155637 A1* | 6/2010 | Mita | .................... | G01D 5/2073 251/129.04 |
| 2010/0319658 A1* | 12/2010 | Uchiyama | ............... | F02D 9/105 123/337 |
| 2011/0128528 A1* | 6/2011 | Al-Rawi | .................. | B62D 6/10 356/138 |
| 2011/0146094 A1* | 6/2011 | Wu | .................... | B62D 15/0215 33/534 |
| 2013/0099107 A1* | 4/2013 | Omoto | .................. | F16C 41/007 250/231.13 |
| 2014/0366632 A1* | 12/2014 | Lerchenmueller | ...... | F01D 17/06 73/509 |
| 2015/0070004 A1* | 3/2015 | Lerchenmueller | ...... | F01D 17/06 324/207.25 |
| 2015/0204750 A1 | 7/2015 | Aoi | | |
| 2015/0337743 A1* | 11/2015 | Cowan | ..................... | F02D 9/08 261/64.2 |
| 2015/0377193 A1* | 12/2015 | Smith | .............. | F02M 35/10249 123/184.21 |

\* cited by examiner

METHOD FOR FORMING A CAPTIVE SPACER HOUSED IN A MOUNTING BASE OF AN ACCELEROMETER SENSOR AND SENSOR EQUIPPED WITH SUCH A MOUNTING BASE

FIELD OF THE INVENTION

The present invention relates to a method for forming a spacer extending at least partially within the length of a central bore passing from one side to the other of a barrel of a mounting base of an accelerometer sensor; a mounting base for the application of the method; and a sensor having a mounting base equipped with such a spacer.

BACKGROUND OF THE INVENTION

An accelerometer sensor of this type comprises a mounting base with a barrel having a central bore receiving a fastening element designed to fix the accelerometer sensor onto a support element. The central bore comprises a spacer gripping the fastening element to center it in the central bore. An encapsulation of plastic material is overmolded around an outer wall of the mounting base.

In the following text, the accelerometer sensor is described as a knock sensor with a fastening element in the form of a specially designed screw. This is purely for the purposes of illustration and is non-limiting, since the accelerometer sensor and the fastening element may be of other types.

There is a known way of fastening a knock sensor to the crankcase or cylinder head of the internal combustion engine of a motor vehicle, by using a fastening element in the form of a screw passing through the central bore of the sensor mounting base. A knock sensor is, notably, described in FR 2 821 432 A1.

It is possible, for example, to use an M8 screw with the application of a tightening torque of between 15 Nm and 30 Nm.

Many motor manufacturers have standardized the tightening torque, allowing for a breaking stress of 33 Nm. A tightening torque of 36 Nm+/−2.5 Nm has been recommended for a grade 10.9 M8 screw. A tightening torque of 15 Nm+/−1 Nm has also been specified for a grade 10.9 M6 screw.

However, an M6 screw tightened at 15 Nm has a compressive force almost equal to an M8 screw tightened at 20 Nm, and is therefore highly suitable for mounting a knock sensor. The present tendency is therefore to use a grade 10.9 M6 screw instead of an M8 screw to mount the sensor on the crankcase. In this case, a centering spacer must be inserted into the central bore in order to grip and center the M6 screw in place of the M8 screw.

If a grade 10.9 M6 screw is used to mount the knock sensor with a centering spacer, then in all cases, that is to say regardless of whether or not the sensor is delivered with an M6 screw, the sensor must be assembled with its spacer during manufacture and must then be delivered in this assembled state.

This gives rise to serious quality control risks, since it is necessary to ensure that the spacer remains present after the assembly operation as it undergoes the operations of storage, packaging and transport and finally the various manipulations of the fitter when the sensor is mounted on the engine crankcase.

In view of these risks of loss, it is also necessary to provide a quick method of checking for the presence of the spacer, for example by giving the spacer a color for rapid visual identification. This results in additional costs for the manufacture of the knock sensor, while only slightly reducing the probability of the presence of a fault, the main faults being the loss of the centering spacer or its incorrect positioning.

For un accelerometer sensor having a mounting base comprising a central bore which receives a centering spacer of a fastening element designed to fix the accelerometer sensor onto a support element, the problem to be resolved by the present invention is that of permanently holding the spacer in position in the central bore of the sensor mounting base before the sensor is fixed to the support element, without the addition of an auxiliary element for keeping the spacer in the central bore.

SUMMARY OF THE INVENTION

For this purpose, the present invention proposes a method for forming a spacer extending at least partially within the length of a central bore passing from one side to the other of a barrel of a mounting base of an accelerometer sensor, the central bore being designed to receive a fastening element for fixing the mounting base onto a support element, the fastening element being centered by the spacer in the central bore, the mounting base being at least partially surrounded by an encapsulation of overmolded plastic material, the method being characterized in that, when the plastic material is overmolded around the mounting base to form the encapsulation, part of the plastic material passes through the barrel to form the spacer while fixing it to the encapsulation.

With this method of forming a spacer in the central bore of a barrel of a mounting base of an accelerometer sensor, the spacer is captive throughout the life of the sensor, because it is fixed to the encapsulation by being made in one piece with the encapsulation. This reinforces the attachment of the encapsulation to the mounting base, and provides a stronger sensor structure, since the spacer helps to keep the encapsulation in position relative to the mounting base by bearing against the wall of the central bore of the barrel, while the encapsulation also keeps the spacer in position.

The flow of plastic material toward the central bore is designed to overmold, in the central bore of the mounting base, a centering spacer which is fixed to the mounting base and is also fixed to the outer encapsulation of the mounting base. This enables the central bore of the barrel of the mounting base to be adapted to receive a smaller fastening element, for example an M6 screw in place of an M8 screw, the fastening element being centered in the bore by the spacer. By adding chamfers to the shape of the spacer overmolded in this way, the forces required to insert the fastening element into the central bore may also be limited.

By contrast with the most similar prior art, where a removable spacer is mounted in the central bore, the operation of mounting and positioning the spacer in the central bore is eliminated. Since the spacer is formed simultaneously with the overmolding of the encapsulation, its formation requires no additional assembly time. Furthermore, it is no longer necessary to use an indicator to prevent the spacer from being omitted, or to provide means for holding the spacer in place in the central bore, since the fact that the spacer is fixed to the encapsulation ensures that it is held in place. Checks for the presence of the spacer are no longer required. The retention of the spacer in the bore is also reinforced. For example, in the case of a knock sensor, a standard grade 10.9 M6 screw may be fitted without any risk of pushing the spacer out of the central bore.

Preferably, before the overmolding of the encapsulation and the fixed spacer, a core having a shape similar to that of the fastening element is positioned in the central bore of the barrel of the mounting base, the core having at least one shoulder contacting the wall of the central bore and forming, during the overmolding, a stop for a longitudinal end of the fixed spacer.

This delimits the filling space for the plastic material forming the spacer, the shoulder limiting the spacer in the length of the bore.

The invention also relates to a mounting base for an accelerometer sensor for the application of this method, the barrel of the mounting base being pierced by at least one channel which has, on the one hand, an inlet end opening outside the barrel on a portion of the barrel to be surrounded by the encapsulation and, on the other hand, an outlet end opening into the central bore of the barrel. One or more such channels allow the plastic material to pass through the barrel. It is therefore simply necessary to pierce a prior art barrel at least once from one side of its wall to the other, to obtain a mounting base that can be used to apply the method according to the invention, this being a modification that is easily made.

By using one or more channels, with an appropriate configuration of the sensor overmolding tools, the overmolding plastic material can be made to flow into the central bore of the barrel of the mounting base, thus producing a centering spacer. The spacer may have a shape which facilitates the insertion of the fastening element into it.

Advantageously, said at least one channel extends substantially perpendicularly to the central bore.

Advantageously, said at least one channel opens into the central bore near a first longitudinal end of the central bore opposite a second longitudinal end which is to be fixed onto the support element. This provides a better distribution of plastic material around the whole interior of the central bore to form the fixed spacer.

Advantageously, the barrel of the mounting base comprises a plurality of channels, whose outlet ends are distributed regularly around the whole of the central bore.

The invention relates to an accelerometer sensor comprising a mounting base with a barrel having a central bore which receives a fastening element designed to fix the accelerometer sensor onto a support element, the central bore comprising a spacer extending at least partially along the length of the bore and gripping the fastening element so as to center it, an encapsulation of plastic material being overmolded around an outer wall of the mounting base, the sensor being characterized in that the mounting base is as described previously, with at least one channel pierced in the barrel, said at least one channel being filled with the plastic material and the spacer being formed of the plastic material of the encapsulation that has passed through said at least one channel, the spacer being thus fixed to the encapsulation.

By having a configuration in which the spacer is fixed to the encapsulation of the mounting base of the accelerometer sensor, all risks of losing the spacer are avoided throughout the life of the sensor, which may be mounted or remounted onto the support element without any risk of losing the spacer. This would not be the case with a removable spacer according to the prior art, since its presence and correct positioning would always have to be checked before any mounting or remounting.

In one embodiment, the fastening element, at a first longitudinal end of the central bore, has a head bearing externally on the barrel, while at a second longitudinal end of the bore it has a threaded part projecting from the sensor when the head of the fastening element bears externally on the barrel, the threaded part being designed to fix the sensor onto a support element.

In a particularly advantageous embodiment of the present invention, in order to ensure that the fastening element does not fall out of the mounting base of the accelerometer sensor, a part of the fastening element inside the central bore carries on its periphery a ring to keep it bearing against an end of the fixed spacer, and to prevent the fastening element from being withdrawn from the accelerometer sensor before the fastening element is fixed to the support element. The retaining ring is protected by being inside the mounting base, and is not in danger of being removed around the fastening element during the various handling or storage procedures that the sensor equipped with the fastening element may undergo.

The present invention also relates to a crankcase of an internal combustion engine of a motor vehicle, said crankcase being the support element of accelerometer sensor of this type used as a knock sensor of the internal combustion engine, the crankcase having a bore for receiving an end portion of the fastening element, which projects from the central bore of the barrel of the sensor mounting base toward the crankcase for fixing the knock sensor to the crankcase.

BRIEF DESCRIPTION OF THE DRAWINGS

Other features, objects and advantages of the present invention will be apparent from a perusal of the following detailed description and the attached drawings provided as non-limiting examples, in which.

DETAILED DESCRIPTION OF THE INVENTION

Figure 1:
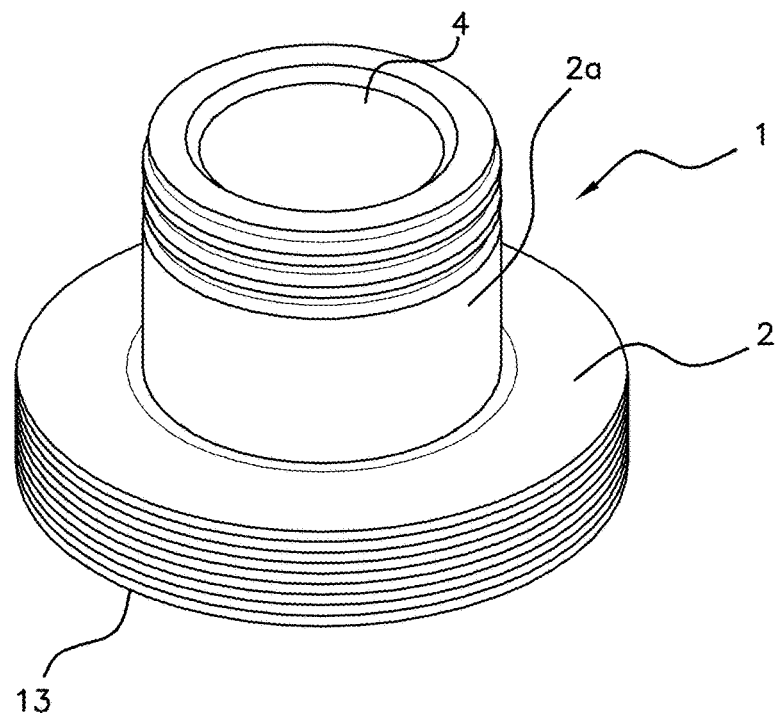
FIGS. 1 and 2 are schematic representations of perspective views, according to the prior art and according to the invention respectively, of an embodiment of an accelerometer sensor mounting base not covered with an encapsulation, with a barrel designed to receive in a central bore a fastening element of the bonded type, the barrel of the mounting base according to the invention shown in FIG. 2 being pierced with four channels for fixing the encapsulation to a spacer, the accelerometer sensor in this embodiment being of the bonded type.

In the following text, for an accelerometer sensor, the term "mounting base" denotes the mid-region of the sensor body, having a barrel and a central bore for the passage of a fastening element, but not including the plastic encapsulation or the acceleration measurement element such as a set of piezoelectric electrodes.

The terms "outside" or "outer" applied to the barrel or the mounting base describe a portion of the barrel or mounting base farthest from the central bore passing through the barrel or mounting base.

The accelerometer sensor is considered to include a fastening element designed to fasten the accelerometer sensor onto a support element.

The spacer may comprise a plurality of spacer portions separated from one another, or may be made in one piece. The length of the spacer is to be understood as relative to the length of the central bore.

With reference to the figures, the present invention relates to an accelerometer sensor 1, which is, for example, but not exclusively, a knock sensor. In a conventional manner, this accelerometer sensor 1 comprises a mounting base 2 forming the main body of the sensor 1.

The mounting base 2 comprises a barrel 2a having a central bore 4 receiving a fastening element 5 designed to fix the accelerometer sensor 1 onto a support element, for example a crankcase of an internal combustion engine in the case of a knock sensor. In a known way, an encapsulation 7 of a plastic material is overmolded around an outer wall of the mounting base 2, thus partially surrounding the mounting base 2.

Also in a known way, the sensor 1 has piezoelectric elements, one end of each element supporting an inertial mass. The elements are housed in a cavity formed between the encapsulation 7 and the mounting base 2.

In one embodiment of the piezoelectric elements and their housing, the cavity has a supporting base plate 13 formed by a portion of the outer wall of the barrel 2a which projects radially from the mounting base 2.

Figure 2:
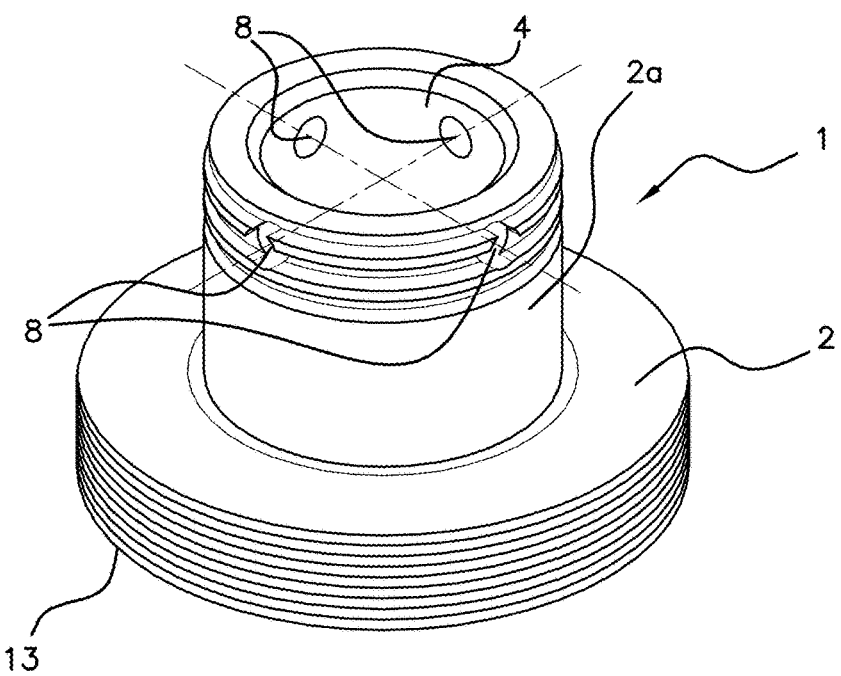
Figure 3:
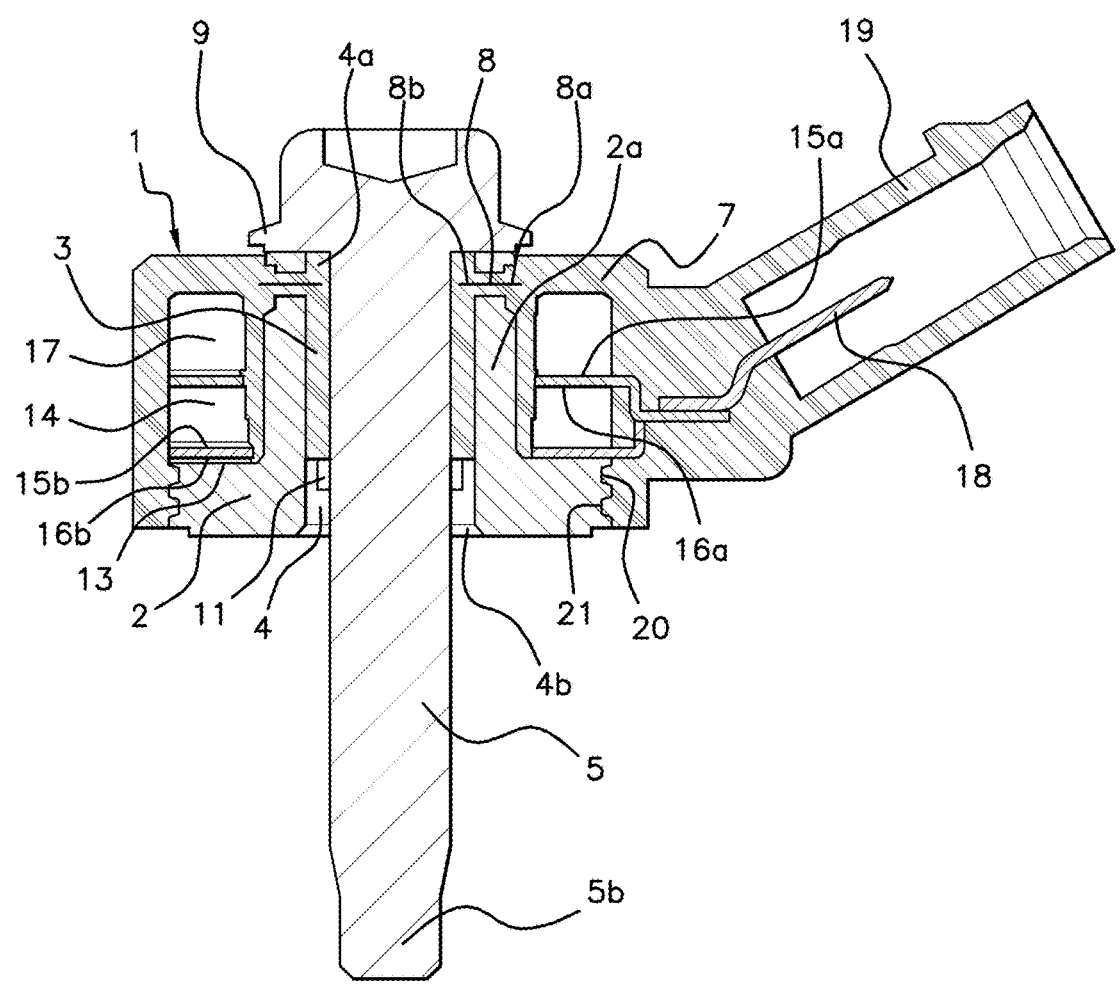
FIG. 3 is a schematic representation of a longitudinal section through a mounting base according to FIG. 2, covered with a plastic encapsulation for a bonded accelerometer sensor according to an embodiment of the present invention.
Figure 4:
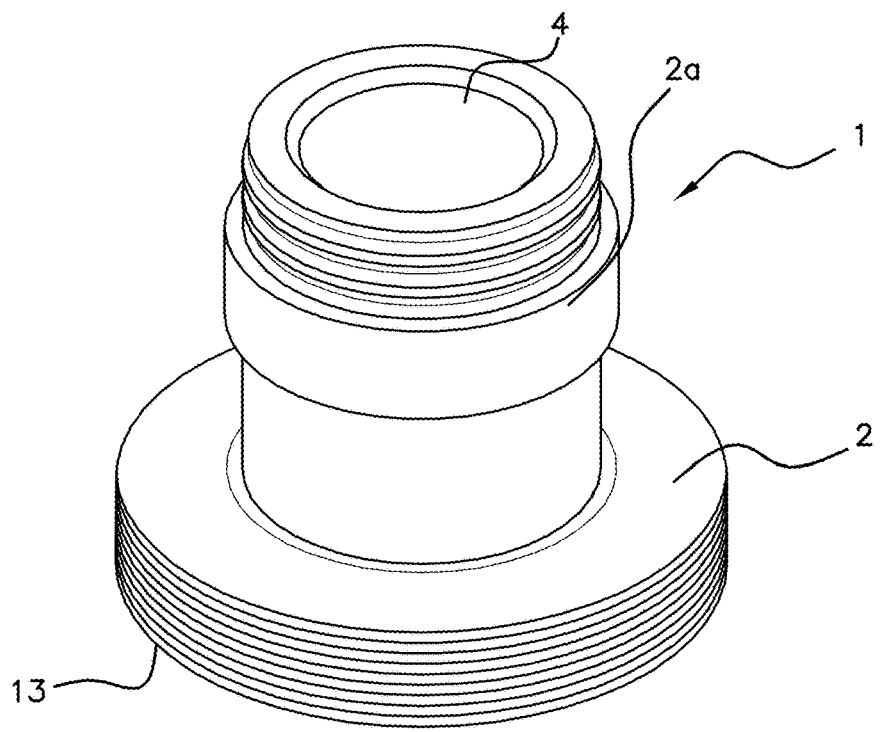
FIGS. 4 and 5 are schematic representations of perspective views, according to the prior art and according to the invention respectively, of an embodiment of an accelerometer sensor mounting base not covered with an encapsulation, with a barrel designed to receive in a central bore a fastening element of the screwed type, the barrel of the mounting base according to the invention being pierced with four channels in FIG. 5 for fixing the encapsulation to a spacer, the accelerometer sensor in this embodiment being of the screwed type.
Figure 5:
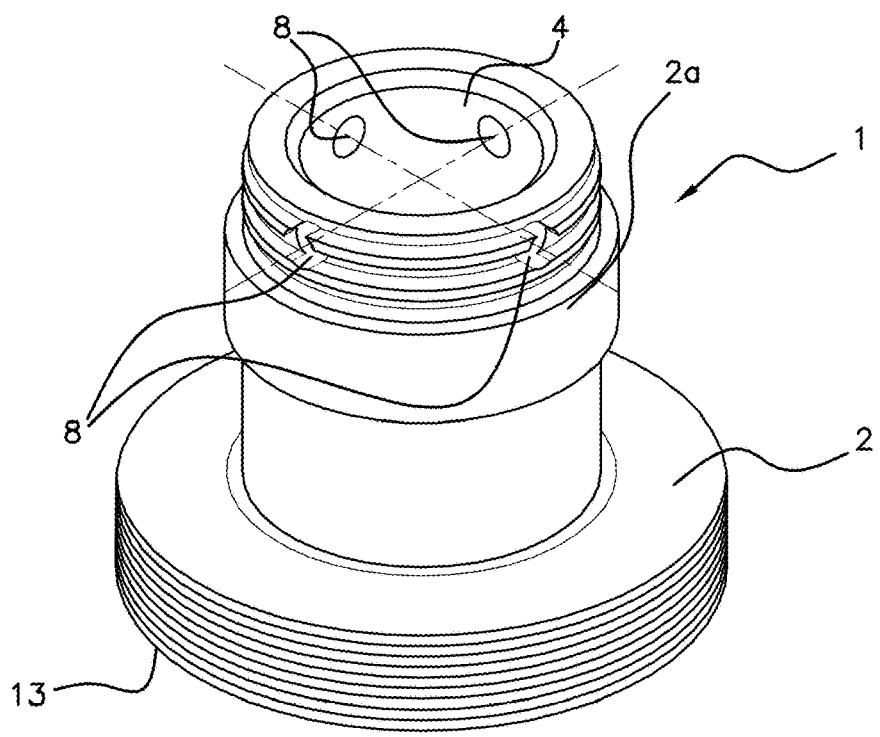
Figure 6:
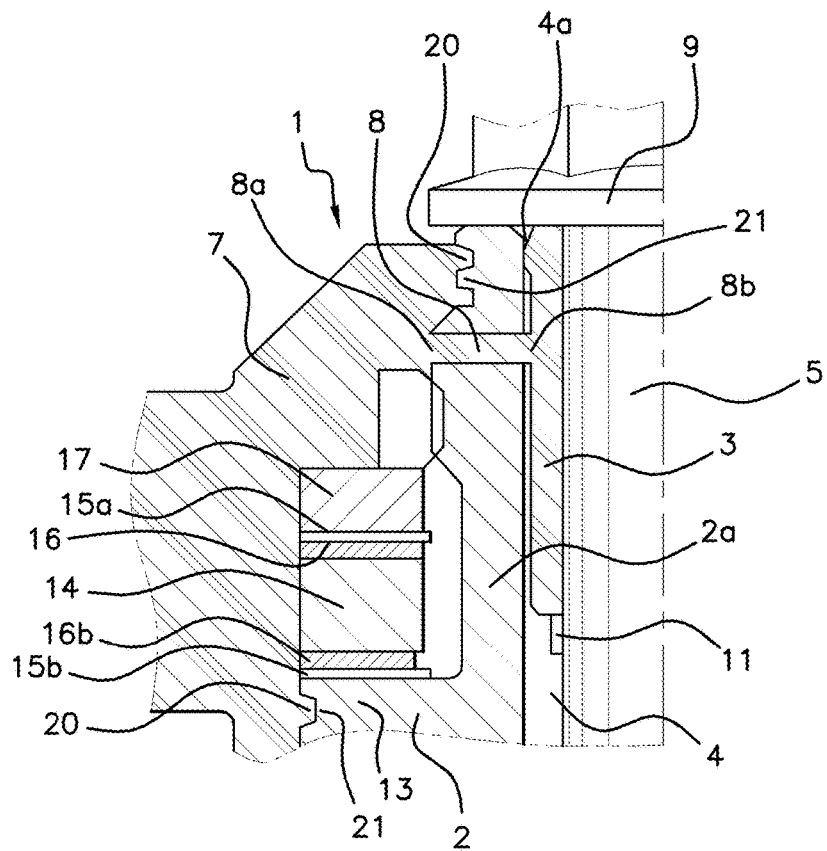
FIG. 6 is a schematic representation of a longitudinal section through an embodiment of a mounting base of an accelerometer sensor of the screwed type according to the present invention, the mounting base being covered with a plastic encapsulation.

This base plate 13 supports a piezoelectric element 14 surrounded by contact rings 16a, 16b acting as electrodes, washers 15a, 15b, and a seismic mass 17, the whole assembly forming a stack, these elements being shown in detail in FIGS. 3 and 6 but not in FIGS. 1, 2, 4 and 5.

To keep this stack assembled, these elements may be bonded together, in which case the accelerometer sensor 1 is said to be bonded, or may be screwed to the mounting base 2, in which case 2 the accelerometer sensor is said to be screwed. FIGS. 1 and 2 show a mounting base 2 for a bonded sensor, while FIGS. 4 and 5 show a mounting base 2 for a screwed sensor, according to the prior art in the case of FIGS. 1 and 4, and according to the present invention in the case of FIGS. 2 and 5. The present invention may therefore be applied equally well to either a bonded sensor or a screwed sensor.

Figure 7:
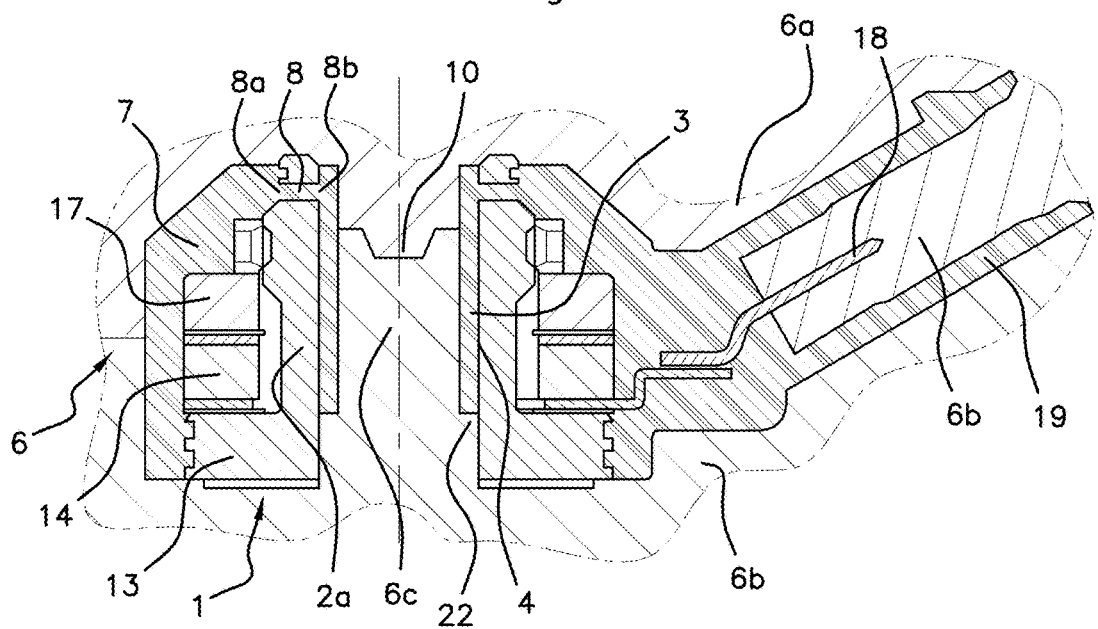
FIG. 7 is a schematic representation of a longitudinal section through a mold designed to form an encapsulation of plastic material around a portion of the mounting base of an accelerometer sensor according to the present invention, the mounting base being inserted into the mold in this figure.

As shown in FIGS. 3 and 7, at least one electrical connection pin 18 connected to each of the contact rings 16a, 16b passes through the encapsulation 7 toward the outside of the accelerometer sensor 1, through a protective bush 19.

Also in a known way, as shown in FIGS. 3, 6 and 7, the central bore 4 comprises a spacer 3 known as a centering spacer, which is advantageously cylindrical if the bore is cylindrical, and which covers the whole periphery of at least a portion of the length of the central bore 4.

The centering spacer 3 extends at least partially along the length of the central bore 4, and grips the fastening element 5 to center it in the central bore 4. The fastening element 5 is introduced into the central bore 4 in order to fasten the mounting base 2, and consequently the accelerometer sensor 1, onto a support element. In the following text, the centering spacer 3 is referred to more simply as a spacer, or as a fixed spacer, because it is fixed to the encapsulation 7, in order to distinguish it from a removable spacer according to the prior art.

According to the prior art, the removable spacer 3 is added manually during assembly, by being inserted into the central bore 4, with the risk that the removable spacer 3 may be incorrectly positioned in the central bore 4, or that the removable spacer 3 may be lost by exiting the central bore 4 at an unsuitable time.

In an approach which is completely opposed to that of the prior art, according to the problem faced by the present invention, notably that of making the spacer 3 captive, a method is provided for forming a fixed spacer 3 extending at least partially along the length of a central bore 4 and passing from one side to the other of a barrel 2a of a mounting base 2 of an accelerometer sensor 1, this method using the operation of overmolding the encapsulation 7 based on plastic material around the whole of the mounting base 2 so that the spacer 3 is simultaneously formed. The spacer 3 is then fixed to the encapsulation 7 by being made in one piece with the encapsulation 7; in other words, it is made of the same material as the encapsulation 7.

Thus, when the plastic material is overmolded around the mounting base 2 to form the encapsulation 7, a part of the plastic material used for the overmolding passes through the barrel 2a to form a spacer 3 fixed to the encapsulation 7 in the central bore 4 of the barrel 2a. When the plastic material of the encapsulation 7 and the spacer 3 solidifies, the spacer 3 and encapsulation 7 are securely fixed together by the plastic material solidified in the barrel 2a of the mounting base 2.

Various types of plastic material may be used. For example, it may be, but is not limited to, polyamide 66. Polyamide 66 has a good level of hardness and abrasion resistance, and is more heat-resistant and less subject to creep. It retains its high strength over a wide temperature range. This is highly appropriate for the conditions which will be encountered by a knock sensor fixed onto a relatively hot crankcase of an internal combustion engine.

A fixed spacer 3 of this type may have a cylindrical shape with a central space left open, this central space having a diameter matching that of the fastening element 5. The fixed spacer 3 may also be made of a plurality of separated parts, each separated part being joined to a channel 8 which passes through the barrel 2a, and which is described more fully below. The first embodiment is preferred.

The fixed spacer 3, or each part of the spacer, may have, on its surface located farthest inside the central bore 4, that is to say the surface facing the fastening element 5, a profile which facilitates the insertion of the fastening element 5 into the central bore 4, and consequently into the barrel 2a of the mounting base 2 of the accelerometer sensor 1.

It is also possible to provide on this innermost face, in addition to a profile facilitating insertion, the same profile which impedes the withdrawal of the fastening element 5, so as to keep it in place if the fastening element 5 is mounted in the accelerometer sensor 1 before the accelerometer sensor 1 is fastened to the means of transport, and is handled in this condition.

Before assembly, the accelerometer sensor 1 may be packaged with its fastening element 5 already incorporated into the accelerometer sensor 1; alternatively, the accelerometer sensor 1 may be packaged without its fastening element 5. However, the profile that impedes the withdrawal of the fastening element 5 must not interfere with the mounting of the accelerometer sensor 1 on the support element or its detachment therefrom.

In this method of forming the spacer 3 fixed to the encapsulation 7, it is useful to limit the quantity of plastic passing through the barrel 2a, in order to leave a free space inside the fixed spacer 3 to match the dimensions of the fastening element 5 to be inserted into the central bore 4 for fastening the accelerometer sensor 1 onto a support element.

For this purpose, with reference to FIG. 7, before the overmolding of the encapsulation 7 and the fixed spacer 3, a core 6c having a shape similar to that of the fastening element 5 may be positioned in the central bore 4 of the barrel 2a of the mounting base 2. This core 6c of elongate shape, also called a plunger, may have the same diameter as the fastening element 5 if the latter is cylindrical, which is commonly the case, or the same width.

The core 6c may also have at least one shoulder 22 contacting the wall of the central bore 4 to form a stop against which an end of the fixed spacer 3 is formed. The shoulder 22 then forms a stop during the overmolding for a longitudinal end 4a of the spacer 3 fixed to the encapsulation 7.

The overmolding of plastic material may be carried out in a mold 6 consisting of two parts 6a, 6b. A first part 6a of the mold 6 encloses the upper part of the mounting base 2, that is to say the part containing the end of the central bore 4 through which the fastening element 5 is to be introduced. A second part 6b of the mold 6 encloses the lower part of the mounting base 2, that is to say the part containing the end of the central bore 4 through which the fastening element 5 extends out of the mounting base 2 toward the support element.

In FIG. 7, it is the second part 6b of the mold 6 that carries the core 6c, but it could equally well be the first part 6a. The first and second parts 6a, 6b of the mold 6 are adjacent to one another, and meet halfway up the mounting base 2 to form a sealed enclosure. A portion of the first part 6a penetrates into the central bore 4 of the mounting base 2, and is joined removably to the core 6c, by having an attachment shape complementary to a facing attachment shape 10 belonging to the core 6c.

The first and second parts 6a, 6b of the mold 6 also delimit a space between them for the encapsulation of the protective bush 19 housing the pin 18, the protective bush 19 being inserted between the two parts 6a, 6b of the mold 6. A mold insert 6d may define the shape of the protective bush 19.

The plastic material that has penetrated into the central bore 4 is confined between the shoulder 22 and a portion of the outer wall of the core 6c, to form a spacer 3 fixed to the encapsulation 7, with the desired dimensions and a suitable configuration. The core 6c may have other projecting portions if the spacer 3 has a more complex shape than a cylindrical spacer, for example portions that create a spacing between a plurality of parts of the spacer 3.

To enable the overmolded plastic material to pass through the mounting base 2 and reach the central bore 4, the barrel 2a of the mounting base 2 is pierced with at least one channel 8, or preferably a plurality of channels 8, to improve the distribution of the plastic material in the central bore 4. FIGS. 2 and 5 show four channels 8 passing through the barrel 2a of the mounting base 2, these channels 8 being positioned in diametrically opposed pairs.

The channel or channels 8 have, on the one hand, an inlet end 8a opening outside the barrel 2a on a portion of the barrel 2a to be surrounded by the encapsulation 7, and, on the other hand, an outlet end 8b opening into the central bore 4 of the barrel 2a.

On completion of the overmolding of the encapsulation 7 around at least a portion of the outer wall of the mounting base 2, the channel or channels 8 are filled with plastic material, and the spacer 3 fixed to the encapsulation 7 is formed by the plastic material of the encapsulation 7 that has passed through the channel or channels 8.

Advantageously, a plurality of channels 8 may be provided, preferably three or four, although a different number of channels 8 may be selected. These channels 8 may be pierced through the barrel 2a by a drill spindle, in which case an even number of channels 8 is preferred so that two facing walls of the barrel 2a can be pierced consecutively with the same spindle. The embodiment shown in FIGS. 2 and 5 is suitable for the consecutive piercing of two diametrically opposed channels 8. These channels 8 may also be pierced by laser. This also applies to the piercing of a single channel 8.

The channel or channels 8 may extend substantially perpendicularly to the central bore 4, or may be slightly inclined relative to the central bore 4. Advantageously, the channel or channels 8 open into the central bore 4 near a first longitudinal end 4a of the central bore 4 opposite a second longitudinal end 4b which is to be fixed onto the support element. The channels 8 may open into the central bore 4 at different heights.

The distribution and uniformity of the plastic material in the fixed spacer 3 must be monitored, to avoid having portions of spacer 3 which are thinner or have localized defects due to a lack of plastic material. For this purpose, if the barrel 2a of the mounting base 2 comprises a plurality of channels 8, the outlet ends 8b of these channels 8 opening into the central bore 4 may be distributed regularly around the whole of the central bore.

To promote the attachment of the encapsulation 7 to the mounting base 2, the outer wall of the mounting base 2 has at least one groove 21, advantageously annular, filled with plastic material of the encapsulation 7. Thus the encapsulation 7 has protrusions 20 of overmolded plastic material penetrating into the groove or grooves 21. These grooves 21 and protrusions 20 are visible, notably, in FIGS. 3 and 6.

Advantageously, there may be at least one pair of grooves in the upper part of the accelerometer sensor 1, that is to say the part farthest from the support element, and at least one pair of grooves 21 in the lower part of the accelerometer sensor 1.

The grooves in the upper part are located on the barrel 2a of the mounting base 2, while the grooves 21 in the lower part are located on the mounting base 2, advantageously below the base plate 13 which projects laterally from the mounting base 2. This base plate 13 was described above as supporting the piezoelectric element 14, which is surrounded by contact rings 16a, 16b acting as electrodes, the washers 15a, 15 and the seismic mass 17.

The grooves 21 in the lower part may be located on the mounting base 2 below the base plate 13 formed by a lateral projecting part of the mounting base 2. The grooves 21 may extend around the whole of the outer wall of the mounting base 2, and the mounting base 2 may have a substantially cylindrical or conical shape.

The channel or channels 8 may be located immediately below the groove or grooves 21 in the upper part of the mounting base 2. FIG. 6 shows a pair of grooves 21 in the upper part of the barrel 2a of the mounting base 2, the pair of grooves 21 in the upper part being interleaved between a head 9 of the fastening element 5 of the accelerometer sensor 1 and the channel or channels 8. This may be the case for a number of grooves other than two.

In FIG. 3, the groove or grooves in the upper part of the barrel 2a of the mounting base 2 are not visible, since they are replaced or masked by channels 8.

With reference, notably, to FIG. 3, the fastening element 5 advantageously takes the form of a screw or the like. The fastening element 5, at a first longitudinal end 4a of the central bore 4, has a head 9 bearing on the barrel 2a of the mounting base 2, that is to say extending beyond the mounting base 2 while being applied against the barrel 2a of the mounting base 2 during the fixing of the accelerometer sensor 1 against its support element.

At a second longitudinal end 4b of the central bore 4, the fastening element 5 has a threaded part 5b projecting from the accelerometer sensor 1 when the head 9 of the fastening element 5 bears against the barrel 2a. The threaded part 5b is designed to fix the sensor 1 onto a support element, such as a crankcase of an internal combustion engine, by being introduced into a corresponding threaded bore of the support element, such as a crankcase.

It is often necessary for an accelerometer sensor 1 to be delivered with its fastening element 5 already located inside the central bore 4 of the barrel 2a of the mounting base 2. Consequently, the fastening element 5 has to be kept in the sensor 1 until the sensor 1 is fixed onto the support element by means of the fastening element 5.

Thus, it has been proposed, according to the prior art, to place a resilient ring on the threaded part 5b of a screw as a fastening element 5 projecting the central bore 4. Another proposal was to inject foam into the central bore 4 to keep the fastening element 5 or to inject foam onto the thread of the fastening element 5 to lock it in position.

In a different manner, the present invention proposes, in an optional embodiment, to arrange for a retaining ring 11 to be carried on the periphery of a part of the fastening element 5 inside the central bore 4, to keep the element bearing against one end of the fixed spacer 3. The retaining ring 11 is therefore inside the central bore 4 and prevents the fastening element 5 from being withdrawn from the accelerometer sensor 1 before the fastening element 5 is fixed onto the support element.

A particularly useful application of the invention is to a knock sensor in the form of an accelerometer sensor 1 fastened onto a crankcase of an internal combustion engine of a motor vehicle which acts as a support element for the knock sensor of the internal combustion engine.

The crankcase then has a bore for receiving an end portion 5b of the fastening element 5 which projects from the central bore 4 of the barrel 2a of the mounting base 2 of the sensor 1 toward the crankcase for fixing the knock sensor to the crankcase.

The invention claimed is:

1. A method for forming a spacer (3) extending at least partially within the length of a central bore (4) passing from one side to the other of a barrel (2a) of a mounting base (2) of an accelerometer sensor (1), the central bore (4) being designed to receive a fastening element (5) for fixing the mounting base (2) onto a support element, the fastening element (5) being centered by the spacer (3) in the central bore (4), the mounting base (2) being at least partially surrounded by an encapsulation (7) of overmolded plastic material, wherein, when the plastic material is overmolded around the mounting base (2) to form the encapsulation (7), part of the plastic material passes through the barrel (2a) to form the spacer (3) while fixing it to the encapsulation (7).

2. The method as claimed in claim 1, wherein, before the overmolding of the encapsulation (7) and the fixed spacer (3), a core (6c) having a shape similar to that of the fastening element (5) is positioned in the central bore (4) of the barrel (2a) of the mounting base (2), the core (6c) having at least one shoulder (22) contacting the wall of the central bore (4) and forming, during the overmolding, a stop for a longitudinal end (4a) of the fixed spacer (3).

3. A mounting base (2) for an accelerometer sensor (1) for the application of the method as claimed in claim 2, wherein the barrel (2a) of the mounting base (2) is pierced by at least one channel (8) having, on the one hand, an inlet end (8a) opening outside the barrel (2a) on a portion of the barrel (2a) to be surrounded by the encapsulation (7), and, on the other hand, an outlet end (8b) opening into the central bore (4) of the barrel (2a).

4. The mounting base (2) as claimed in claim 3, wherein said at least one channel (8) opens into the central bore (4) near a first longitudinal end (4a) of the central bore (4) opposite a second longitudinal end (4b) which is to be fixed onto the support element.

5. The mounting base (2) as claimed in claim 3, wherein said at least one channel (8) opens into the central bore (4) near a first longitudinal end (4a) of the central bore (4) opposite a second longitudinal end (4b) which is to be fixed onto the support element.

6. A mounting base (2) for an accelerometer sensor (1) for the application of the method as claimed in claim 1, wherein the barrel (2a) of the mounting base (2) is pierced by at least one channel (8) having, on the one hand, an inlet end (8a) opening outside the barrel (2a) on a portion of the barrel (2a) to be surrounded by the encapsulation (7), and, on the other hand, an outlet end (8b) opening into the central bore (4) of the barrel (2a).

7. The mounting base (2) as claimed in claim 6, wherein the barrel (2a) of the mounting base (2) comprises a plurality of channels (8) whose outlet ends (8b) are distributed regularly around the whole of the central bore (4).

8. The mounting base (2) as claimed in claim 6, wherein said at least one channel (8) opens into the central bore (4) near a first longitudinal end (4a) of the central bore (4) opposite a second longitudinal end (4b) which is to be fixed onto the support element.

9. The mounting base (2) as claimed in claim 8, wherein the barrel (2a) of the mounting base (2) comprises a plurality of channels (8) whose outlet ends (8b) are distributed regularly around the whole of the central bore (4).

10. The mounting base (2) as claimed in claim 6, wherein said at least one channel (8) extends substantially perpendicularly to the central bore (4).

11. The mounting base (2) as claimed in claim 10, wherein the barrel (2a) of the mounting base (2) comprises a plurality of channels (8) whose outlet ends (8b) are distributed regularly around the whole of the central bore (4).

12. The mounting base (2) as claimed in claim 10, wherein said at least one channel (8) opens into the central bore (4) near a first longitudinal end (4a) of the central bore (4) opposite a second longitudinal end (4b) which is to be fixed onto the support element.

13. The mounting base (2) as claimed in claim 12, wherein said at least one channel (8) opens into the central bore (4) near a first longitudinal end (4a) of the central bore (4) opposite a second longitudinal end (4b) which is to be fixed onto the support element.

14. An accelerometer sensor (1) comprising a mounting base (7) with a barrel (2a) having a central bore (4) which receives a fastening element (5) designed to fix the accelerometer sensor (1) onto a support element, the central bore (4) comprising a spacer (3) extending at least partially along the length of the central bore (4) and gripping the fastening element (5) so as to center it in the central bore (4), an encapsulation (7) of plastic material being overmolded around an outer wall of the mounting base (2), wherein the mounting base (2) is as described in claim 6, with at least one channel (8) pierced in the barrel (2a), said at least one channel (8) being filled with the plastic material and the spacer (3) being formed of the plastic material of the encapsulation (7) that has passed through said at least one channel (8), the spacer (3) being thus fixed to the encapsulation (7).

15. A crankcase of an internal combustion engine of a motor vehicle, wherein the crankcase is the support element of an accelerometer sensor (1) as claimed in claim 14, the accelerometer sensor (1) being a knock sensor of the internal combustion engine, the crankcase having a bore for receiving an end portion (5b) of the fastening element (5) which projects from the central bore (4) of the barrel (2a) of the mounting base (2) of the sensor (1) toward the crankcase for fixing the knock sensor (1) to the crankcase.

16. The accelerometer sensor (1) as claimed in claim 14, wherein a part of the fastening element (5) inside the central bore (4) carries on its periphery a retaining ring (11) to keep it bearing against an end of the fixed spacer (3), and to prevent the fastening element (5) from being withdrawn from the accelerometer sensor (1) before the fastening element (5) is fixed to the support element.

17. A crankcase of an internal combustion engine of a motor vehicle, wherein the crankcase is the support element of an accelerometer sensor (1) as claimed in claim 16, the accelerometer sensor (1) being a knock sensor of the internal combustion engine, the crankcase having a bore for receiving an end portion (5b) of the fastening element (5) which projects from the central bore (4) of the barrel (2a) of the mounting base (2) of the sensor (1) toward the crankcase for fixing the knock sensor (1) to the crankcase.

18. The accelerometer sensor (1) as claimed in claim 14, wherein the fastening element (5), at a first longitudinal end (4a) of the central bore (4), has a head (9) bearing externally on the barrel (2a), while at a second longitudinal end of the central bore (4) it has a threaded part (5b) projecting from the sensor (1) when the head (9) of the fastening element (5) bears externally on the barrel (2a), the threaded part (5b) being designed to fix the sensor (1) onto a support element.

19. The accelerometer sensor (1) as claimed in claim 18, wherein a part of the fastening element (5) inside the central bore (4) carries on its periphery a retaining ring (11) to keep it bearing against an end of the fixed spacer (3), and to prevent the fastening element (5) from being withdrawn from the accelerometer sensor (1) before the fastening element (5) is fixed to the support element.

20. A crankcase of an internal combustion engine of a motor vehicle, wherein the crankcase is the support element of an accelerometer sensor (1) as claimed in claim 18, the accelerometer sensor (1) being a knock sensor of the internal combustion engine, the crankcase having a bore for receiving an end portion (5b) of the fastening element (5) which projects from the central bore (4) of the barrel (2a) of the mounting base (2) of the sensor (1) toward the crankcase for fixing the knock sensor (1) to the crankcase.

* * * * *